(12) United States Patent
Cieszyński et al.

(10) Patent No.: US 11,077,618 B2
(45) Date of Patent: Aug. 3, 2021

(54) METHOD AND APPARATUS FOR FORMING A THREE-DIMENSIONAL ARTICLE BY FUSION OF A POWDERED MEDIUM IN A POWDER BED

(71) Applicant: NXT FACTORY INC., Ventura, CA (US)

(72) Inventors: Tomasz P. Cieszyński, Sosnowiec (PL); Jakub Graczyk, Cracow (PL); Avi N. Reichental, Carpinteria, CA (US)

(73) Assignee: NXT FACTORY INC., Ventura, CA (US)

( * ) Notice: Subject to any disclaimer, the term of this patent is extended or adjusted under 35 U.S.C. 154(b) by 347 days.

(21) Appl. No.: 15/914,741

(22) Filed: Mar. 7, 2018

(65) Prior Publication Data
US 2018/0272613 A1 Sep. 27, 2018

Related U.S. Application Data

(60) Provisional application No. 62/474,836, filed on Mar. 22, 2017.

(51) Int. Cl.
B29C 64/393 (2017.01)
B29C 64/277 (2017.01)
(Continued)

(52) U.S. Cl.
CPC .......... *B29C 64/393* (2017.08); *B22F 10/20* (2021.01); *B29C 64/153* (2017.08); *B29C 64/268* (2017.08); *B29C 64/277* (2017.08); *B33Y 10/00* (2014.12); *B33Y 30/00* (2014.12); *B33Y 50/02* (2014.12); *B22F 10/30* (2021.01); *Y02P 10/25* (2015.11)

(58) Field of Classification Search
CPC ... B29C 64/205; B29C 64/277; B29C 64/268; B29C 64/393; B29C 64/153;
(Continued)

(56) References Cited

U.S. PATENT DOCUMENTS 5,589,955 A * 12/1996 Amako ................ G03H 1/2294
359/9
2015/0306819 A1* 10/2015 Ljungblad ............. B29C 64/277
419/55
(Continued)

FOREIGN PATENT DOCUMENTS

CN 106498387 A 3/2017
EP 1466718 A2 10/2004
(Continued)

OTHER PUBLICATIONS

Communication pursuant to Article 94(3) EPC dated Sep. 28, 2020, from the European Patent Office, for European Application No. 18721449.9, 4 pgs.
(Continued)

*Primary Examiner* — Matthew J Daniels
*Assistant Examiner* — Gregory Chad Grosso
(74) *Attorney, Agent, or Firm* — Ascenda Law Group, PC

(57) ABSTRACT

Methods and apparatus for forming a three-dimensional article in which a powdered medium is distributed in a powder bed, heated to a temperature below its melting point, and fused by means of a laser beam projected in the form of an image of a cross section of the three-dimensional article. The image of the cross-sectional layer is created by spatial light modulation of the laser beam using an LCoS display. During the fabrication process, characteristics of the image of the cross-sectional layer are controlled through monitoring of the projection of a holographic representation of the image using one or more imaging devices.

8 Claims, 9 Drawing Sheets

(51) Int. Cl.
  *B22F 10/20* (2021.01)
  *B33Y 10/00* (2015.01)
  *B33Y 30/00* (2015.01)
  *B33Y 50/02* (2015.01)
  *B29C 64/153* (2017.01)
  *B29C 64/268* (2017.01)
  *B22F 10/30* (2021.01)

(58) Field of Classification Search
  CPC ........ B29C 35/0805; B29C 2035/0838; B33Y 10/00; B33Y 30/00; B33Y 50/02; B22F 3/1055; B22F 2003/1057; Y02P 10/295
  See application file for complete search history.

(56) References Cited

U.S. PATENT DOCUMENTS

| | | |
|---|---|---|
| 2016/0243649 A1 | 8/2016 | Zheng et al. |
| 2017/0225393 A1* | 8/2017 | Shkolnik ................ B33Y 10/00 |
| 2017/0232637 A1* | 8/2017 | DeMuth ................ B22F 10/20 |
| | | 264/497 |
| 2018/0207722 A1* | 7/2018 | Feldmann .............. B33Y 10/00 |

FOREIGN PATENT DOCUMENTS

| | | |
|---|---|---|
| EP | 3037246 A2 | 6/2016 |
| PL | 226544 B1 | 8/2017 |
| WO | 2016/202753 A1 | 12/2016 |

OTHER PUBLICATIONS

International Preliminary Report on Patentability dated Sep. 24, 2019, from the International Bureau of WIPO, for International Patent Application No. PCT/IB2018/000401 (filed Mar. 7, 2018), 7 pages.

Kugra SP. Z O.O.; International Application No. PCT/IB2018/000401 filed Mar. 7, 2018; International Search Report and Written Opinion; ISA/EP; dated Jun. 21, 2018; 15 pages.

\* cited by examiner

METHOD AND APPARATUS FOR FORMING A THREE-DIMENSIONAL ARTICLE BY FUSION OF A POWDERED MEDIUM IN A POWDER BED

RELATED APPLICATIONS

This is a NONPROVISIONAL of and incorporates by reference U.S. Provisional Application No. 62/474,836, filed Mar. 22, 2017.

FIELD OF THE INVENTION

The present invention relates generally to methods and apparatus for additive manufacturing, and in particular to such methods and apparatus as facilitate formation of entire cross-sectional layers of an object at a time.

BACKGROUND

So-called "3D printing" or, more generally, additive manufacturing, is a broad term used to describe processes to fabricate three-dimensional objects from digital data files under computer control. A number of different additive manufacturing techniques have been developed, including selective laser sintering (SLS). SLS involves the fusing of material, typically a metal, polymer, or ceramic powder, at points in space defined by a digital model file, using a laser. For a given cross-sectional layer of the model, the focal point of the laser is scanned over a bed of powdered material, causing the material to form a solid mass at the points heated, individually, by the laser. After each cross-section is scanned, the powder bed is lowered, a new layer of the material is applied, and the process is repeated. This continues, point-by-point for each cross-sectional layer of the object under fabrication until the desired object is completed.

SLS is a popular method for producing prototypes of new designs and for fabricating components. However, because conventional SLS printers rely on a single laser beam scanned over what may be a large cross-section of a desired object, printing times can be quite long. These long printing times can act as a bottleneck to rapid prototype development and other manufacturing tasks.

SUMMARY OF THE INVENTION

Described herein are methods and apparatus for forming a three-dimensional article by fusion of a powdered medium in a powder bed. In one embodiment, a first layer of a powdered medium (e.g., a metal, polyamide, or other material) is distributed over a powder bed. This may be accomplished by rolling the material in a thin layer over the powder bed, or by otherwise depositing the layer over same, so that a relatively thin, uniform layer of the powdered medium is distributed thereon. In some instances, the powdered medium may be distributed through gravity feed and then rolled or scraped to form the relatively thin, uniform layer on the powder bed. Once distributed, the relatively thin, uniform layer of powdered medium, or at least a portion thereof, may be heated to a temperature below its melting point. This heating may be accomplished in any of a variety of ways, including using infra-red heaters, and/or by directing a laser beam towards the powder bed through a defined optical path. Where a laser is used, the beam is preferably modified to have desired energy over its beam width and is directed to encompass a working space of the powder bed, or at least a portion thereof.

An image of a cross-sectional layer of an object (complete or at least partially complete) to be fabricated is focused on the layer of the powdered medium distributed over said powder bed, or at least a portion thereof. The image of the cross-sectional layer is preferably created by spatial light modulation of a laser beam and projection of a resulting spatial light modulated laser beam through a defined optical path onto the layer of the powdered medium (or portion thereof). The spatial light modulated laser beam has sufficient energy to fuse that portion of the powdered medium in locations in the powder bed corresponding to the image of the cross-sectional layer of the object to be fabricated to form an integral layer of the powdered medium having a shape corresponding to that image of the cross-sectional layer of the object. Other portions of the powdered medium on the powder bed remain unfused and surround the integral or fused portion of the layer of powdered medium, thereby supporting it.

Next, a second layer of the powdered medium is distributed over the first layer, and the forgoing process is repeated using an image of a second cross-sectional layer of the object to be fabricated to form an integral layer of the powdered medium having a shape corresponding thereto. This process is repeated for additional layers of the powdered medium, each being distributed over immediately preceding layers thereof, and additional images of respective additional cross-sectional layers of the object, so as to form the three-dimensional article.

During the above-described fabrication process, the image quality of the respective images of the cross-sectional layers of the object at the powder bed may be controlled through monitoring using one or more imaging devices, e.g., infra-red imaging devices and/or charge coupled device (CCD) cameras. By evaluating images of the layers as they are being fused, the laser light incident on the respective layers of the powdered medium may be controlled in accordance therewith. For example, an image of a cross-sectional layer of the three-dimensional article used to produce the article under fabrication may be modified according to feedback provided by one or more imaging devices so that gray levels of one or more areas of the image are adjusted from those associated with an original version of image. The feedback would include image analysis of a projection of the original image of the respective cross-sectional layer on the powdered medium in the powder bed. The imaging devices may provide images in the infra-red and/or visible portions of the spectrum.

In the above-described process, where a laser is used to heat those portions of a layer of the powdered medium to a temperature below its melting point, that laser and the laser used to form the spatial light modulated laser beam may be created from a common laser beam using a beam splitter.

In the above-described process, spatial light modulation of the laser to form the spatial light modulated laser beam may be accomplished by generating a holographic image of a respective cross-sectional layer of the object on a liquid crystal on silicon (LCoS) panel, directing a non-spatial light modulated portion of the laser beam to be incident on the holographic image, and using a reflected portion of the laser beam from the holographic image of the cross-sectional layer of the object on the LCoS panel as the spatial light modulated first laser beam. In such instances, the holographic image of the cross-sectional layer of the object on the LCoS panel may be corrected for image distortions, e.g., $0^{th}$ order diffraction effects in the spatial light modulated first laser beam at an image plane and other distortions.

These and further aspects of the present invention are described in greater detail below.

BRIEF DESCRIPTION OF THE DRAWINGS

The present invention is illustrated by way of example, and not limitation, in the figures of the accompanying drawings, in which:

FIG. 3A illustrates projecting optics with a focusing lens realizing Fourier transformation and a focusing lens realizing projection; FIG. 3B illustrates projecting optics with a focusing lens realizing Fourier transformation and an objective realizing projection; and FIG. 3C illustrates projecting optics with a focusing lens realizing Fourier transformation and a negative lens realizing projection;

DETAILED DESCRIPTION

Figure 1A:
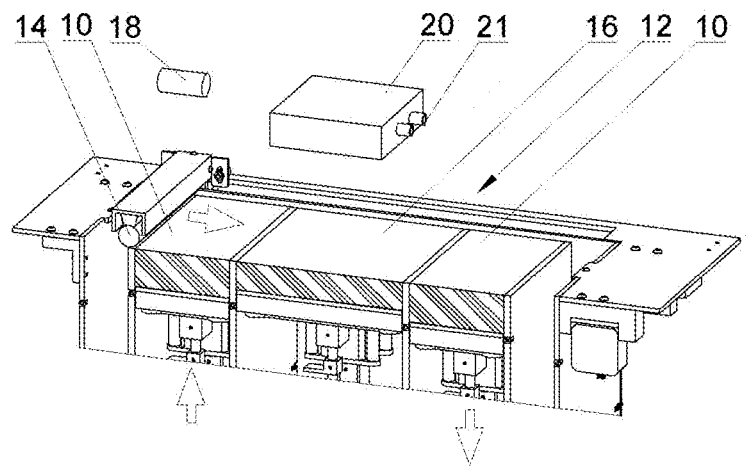
FIGS. 1A-1C illustrate an embodiment of a system for powder bed fusion configured in accordance with embodiments of the present invention.
Figure 1B:
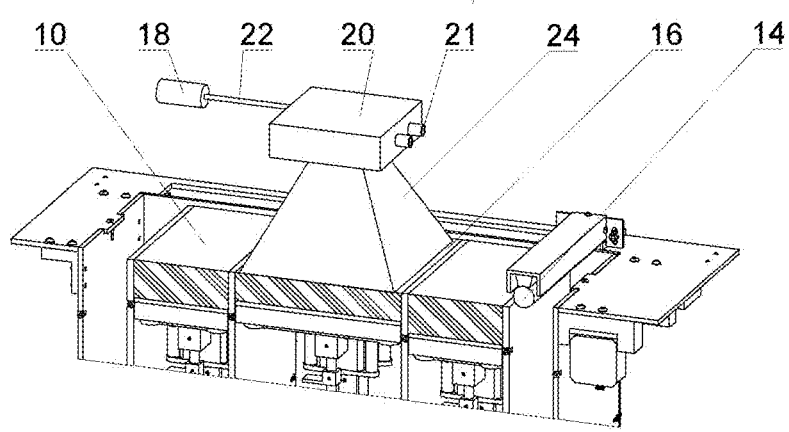
Figure 1C:
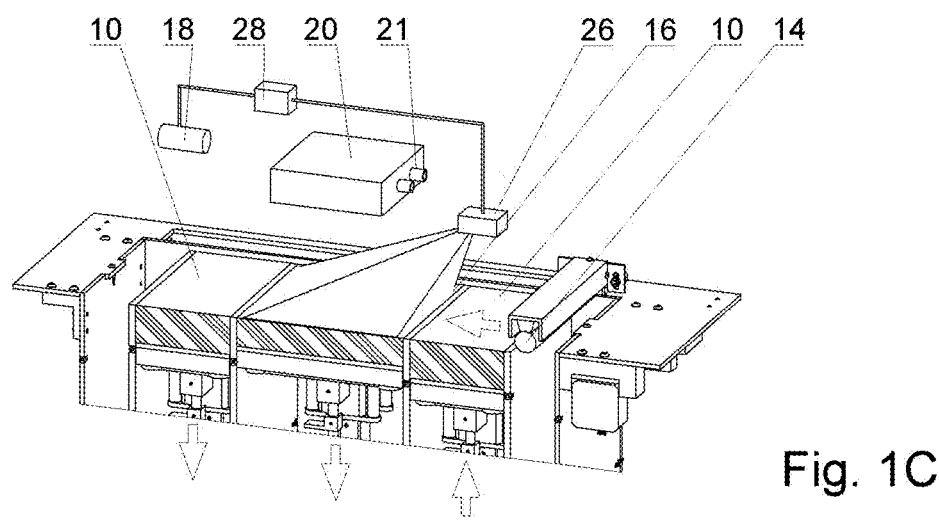

Described herein are methods and apparatus for forming a three-dimensional article by fusion of a powdered medium in a powder bed. As shown in FIGS. 1A-1C, a first layer of a powdered medium 10 (e.g., a metal, polyamide, or other material) is distributed over a powder bed 12. This may be accomplished by spreading the material in a thin layer over the powder bed using a roller motion mechanism 14, or by otherwise depositing the layer over same, so that a relatively thin, uniform layer of the powdered medium is distributed on the powder bed. In some instances, the powdered medium may be distributed through gravity feed and then rolled or scraped to form the relatively thin, uniform layer on the powder bed.

Once distributed, the relatively thin, uniform layer of powdered medium, or at least a portion thereof in a work area 16, may be heated to a temperature below its melting point. This heating may be accomplished in any of a variety of ways, including using infra-red lamps, and/or by directing a laser beam having a desired energy distribution over its beam width towards the powder bed through a defined optical path as discussed further below. Where a laser is used, the beam width of the laser is preferably wide enough to encompass the work area 16 of the powder bed 12, or at least a portion thereof.

An image of a cross-sectional layer of a work piece (i.e., an object to be fabricated) is focused on the layer of the powdered medium distributed over the work area 16 of powder bed 12, using a laser source 18 and imaging system 20. As discussed further below, the image of the first cross-sectional layer (e.g., a complete cross-section or at least a partially complete cross-section) is preferably created by spatial light modulation of a laser beam 22 and projection of a resulting spatial light modulated laser beam 24 through a defined optical path onto the layer of the powdered medium in the work area 16. The spatial light modulated laser beam has sufficient energy to fuse that portion of the powdered medium in locations in the work area of the powder bed corresponding to the image of the first cross-sectional layer of the object to be fabricated to form an integral layer of the powdered medium having a shape corresponding to that image of the first cross-sectional layer of the object. Other portions of the powdered medium on the powder bed remain unfused and surround the integral or fused portion of the layer of powdered medium, supporting it.

Next, as shown in FIG. 1C, the powder bed 12 is lowered, and a second layer of the powdered medium 10 is distributed over the first layer (e.g., using roller 14), and the foregoing process is repeated using an image of a second cross-sectional layer of the object to be fabricated, to form an integral layer of the powdered medium having a shape corresponding thereto. This process may be repeated for additional layers of the powdered medium, each being distributed over immediately preceding layers thereof, and additional images of respective additional cross-sectional layer of the object, so as to form the three-dimensional article.

During the above-described fabrication process, the image quality of the respective images of the cross-sectional layers of the object at the powder bed may be controlled through monitoring using one or more imaging devices 26 (shown in FIG. 1C only, for clarity). The imaging devices may provide images in the infra-red and/or visible portion of the spectrum and may be infra-red imaging devices, CCDs, and/or other imaging devices. By evaluating the images of the layers as they are being fused, e.g., using imaging device 26 and controller 28, times of projecting of the laser on the respective layers of the powdered medium in the powder bed and/or intensity of the laser beam (or, more generally, times of the fusing process) may be set and adjusted in accordance therewith. Controller 28 may, for example, be a computer-based controller configured (under appropriate software instructions) to receive infra-red images from imaging device 26 and to evaluate said images (e.g., based on color or other characteristics) to determine properties of each layer as it is created. For example, pixels of the infra-red images provided by imaging device 26 may be assessed against cross sectional layer models of the object undergoing fabrication to determine whether the areas of the powdered medium corresponding to said layer are being heated to appropriate temperatures to effect fusing of the medium. Similarly, adjacent areas of the powdered medium that do not form part of the cross-sectional layer of the object may be evaluated to ensure they are not being heated to melting points of the powdered medium so as to ensure those areas are not fused. Likewise, background heating can be evaluated and adjusted, if necessary, in accordance with images provided by imaging device 26.

In the above-described process, where a laser is used to heat those portions of a layer of the powdered medium to a temperature below its melting point, that laser and the laser used to form the spatial light modulated laser beam may be created from a common laser beam using a beam splitter (not shown in this view).

In the above-described process, spatial light modulation of the laser to form the spatial light modulated laser beam may be accomplished by generating a holographic image of a respective cross-sectional layer of the object on a liquid crystal on silicon (LCoS) panel, directing a non-spatial light modulated portion of the laser beam to be incident on the holographic image, and using a reflected portion of the laser beam from the holographic image of the first cross-sectional layer of the object on the LCoS panel as the spatial light modulated first laser beam. In such instances, the holographic image of the cross-sectional layer of the object on the LCoS panel may be corrected for $0^{th}$ order diffraction effects and/or other image effects in the spatial light modulated first laser beam at an image plane. In alternative embodiments, spatial light modulation of the laser may be effected through use of a digital micromirror device (DMD), which may be controlled to produce a representation of the cross-sectional layer of the object to be fabricated. DMDs are commonly used in digital light projectors and typically include many microscopic mirrors arranged in an array. The mirrors, which correspond to pixels in an image, can be individually rotated to an "on" or "off" position, thus allowing for selected pixels of an incident laser be to be reflected or not. DMDs thus provide amplitude spatial light modulation of the incident laser beam. Although in the remaining discussion the use of LCoS devices is highlighted, it should be appreciated that this discussion applies equally to the use of DMD devices in place of, or in combination with, LCoS devices.

Figure 2:
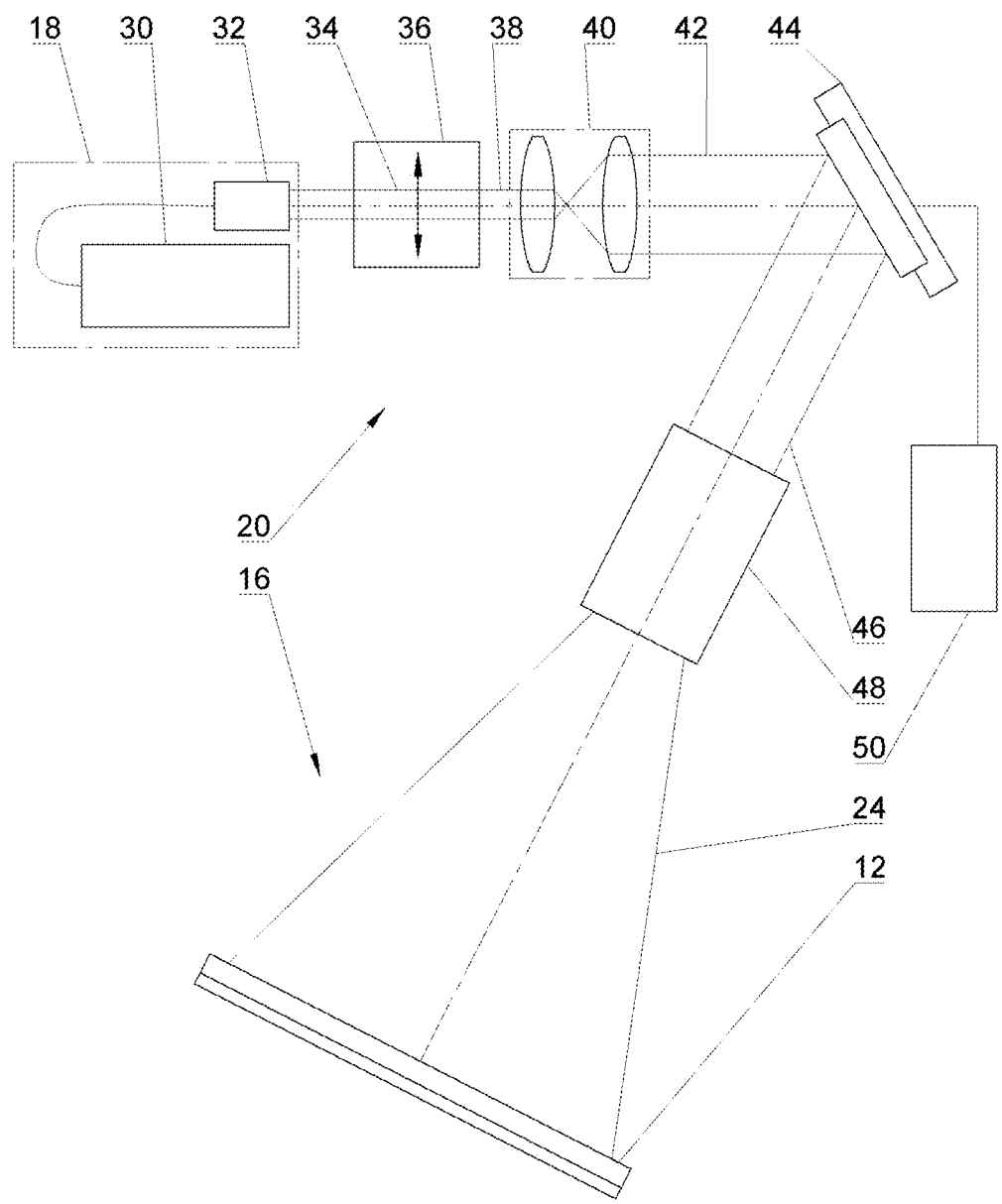
FIG. 2 illustrates an example of an imaging system for use in connection with the system for powder bed fusion shown in FIGS. 1A-1C.

FIG. 2 illustrates one embodiment of an optical arrangement which may be used in the apparatus discussed above in connection with FIGS. 1A-1C. In this example, the laser source 18 includes a laser 30 optically coupled with a fiber collimator 32. The fiber collimator provides a collimated light beam 34 to a polarizing beam splitter 36, such that a portion 38 of the incident beam is provided at the output of the polarizing beam splitter. This polarized beam (e.g., linearly polarized beam) is provided as an input to beam expander 40, which expands the beam width of the polarized beam to produce a collimated, polarized (e.g. linearly polarized), and expanded beam 42. Note that if the laser beam from collimator 32 is already polarized (e.g., linearly polarized), polarizing beam splitter 36 may be omitted from the optical arrangement.

Figure 4:
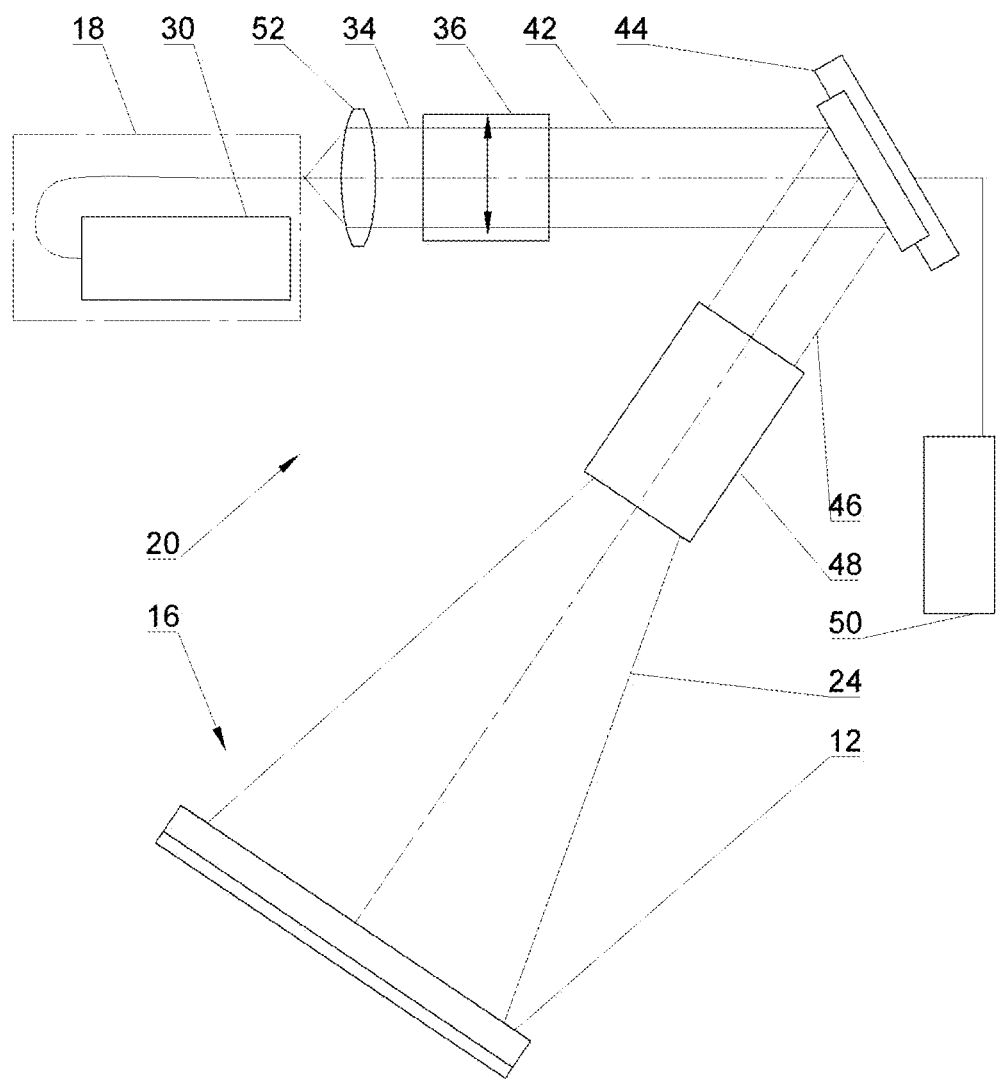
FIG. 4 illustrates another example of an imaging system for use in connection with the system for powder bed fusion shown in FIGS. 1A-1C; in this example, laser light is not collimated, and a collimation lens is used for both collimation and beam expansion.

The collimated, polarized, and expanded beam 42 is made incident upon an LCoS panel 44. The LCoS panel 44 is under computer control 50 so as to spatially light modulate the incident laser beam 42 to form a spatial light modulated laser beam 46. Computer-based controller 50 generates a holographic image of a respective cross-sectional layer of the object to be fabricated and displays same via LCoS panel 44, thereby causing a portion of the non-spatial light modulated incident laser beam 42 to be reflected from the LCoS panel 44 as the spatial light modulated laser beam 46. In some embodiments, the holographic image of the cross-sectional layer of the object on the LCoS panel 44 may be corrected for 0th order diffraction effects (and/or other image effects) in the spatial light modulated laser beam 46 at an image plane on powder bed 12. The spatially light modulated laser beam 46 is directed by projecting optics 48 (e.g., a microspot focusing objective) to the work area 16 of powder bed 12. In some embodiments, for example as shown in FIG. 4, a collimator 52 that is optically coupled with laser 30 may be used as a beam expander to provide a collimated and expanded light beam to beam splitter 36 and LCoS panel 44.

Although not shown in the illustration, in some embodiments a portion of the laser beam not directed to LCoS panel 44 by beam splitter 36 may be provided to a similar optical arrangement to direct a second laser beam (appropriately spatially light modulated by a second LCoS panel, DMD, or other arrangement) to the same work area on the powder bed. This would have the effect of increasing (perhaps doubling) the light power delivered to the work area.

Figure 6:
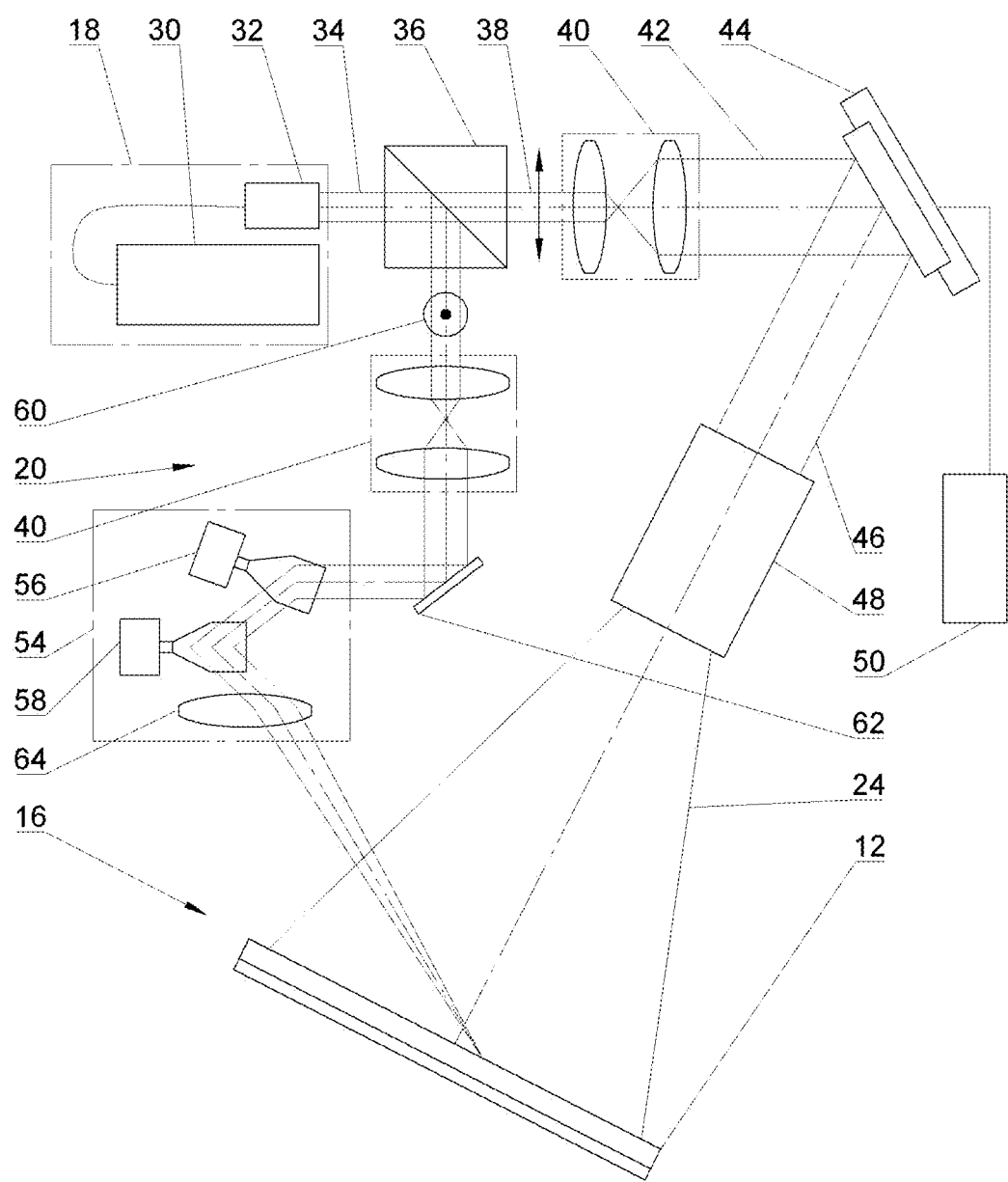
FIG. 6 illustrates yet another example of an imaging system for use in connection with the system for powder bed fusion shown in FIGS. 1A-1C; in this example, a second optical path utilizes a mirror galvanometer system for high definition edges.

Alternatively, or in addition, a portion of the laser beam not directed to LCoS panel 44 by beam splitter 36 may be provided to a second imaging arrangement (as shown in FIG. 6) to fabricate contours around the cross section being fused, thereby increasing the resolution of this imaged cross section. An appropriate optical arrangement for such a system may include a mirror galvanometer, as are commonly used in SLS systems, or other directing system.

Also, in still further embodiments, a portion of the laser beam not directed to LCoS panel 44 by beam splitter 36 may be directed through appropriate optics (which may include a second spatial light modulator or DMD) to provide a modified beam with desired energy density across its beam width that is subsequently used to provide background heating of the work area, e.g., in place of or in addition to infra-red heaters to heat the powdered medium in the work space to a temperature just below its melting point. For example, the infra-red heaters may be used to heat the powdered medium to a first temperature below the melting point of the powdered medium, and the portion of laser beam not directed to LCoS panel 44 by beam splitter 36 may be used to heat the powdered medium to a second temperature, the second temperature being higher than the first temperature but still below the melting point of the powdered medium. Temperatures of the powdered medium may be evaluated at one or more points using the imaging devices and/or other temperature sensors.

Figure 3A:
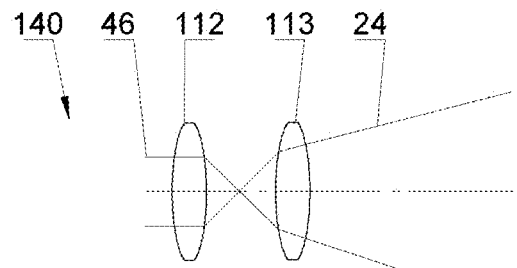
FIGS. 3A-3C illustrate various examples of projecting optics for use in connection with the imaging system shown in FIGS. 2, 4, and 6; in particular.
Figure 3B:
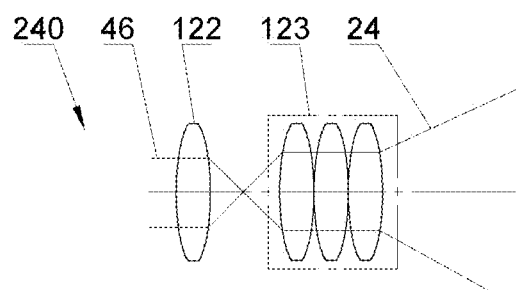
Figure 3C:
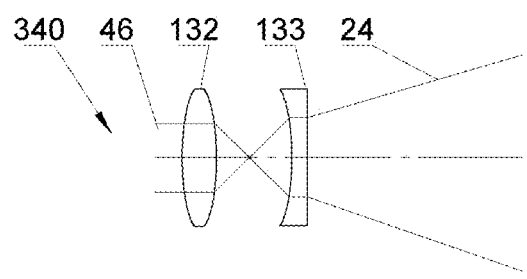

FIGS. 3A-3C illustrate various examples of projecting optics (48) for use in connection with the imaging systems shown in FIG. 2, FIG. 4, and/or FIG. 6, the latter of which is discussed further below. FIG. 3A illustrates projecting optics 140 with focusing lens 112 realizing Fourier transformation and a focusing lens 113 realizing projection. FIG. 3B illustrates projecting optics 240 with a focusing lens 122 realizing Fourier transformation and an objective 123 realizing projection. FIG. 3C illustrates projecting optics 340 with a focusing lens 132 realizing Fourier transformation and a negative lens 133 realizing projection.

Figure 5:
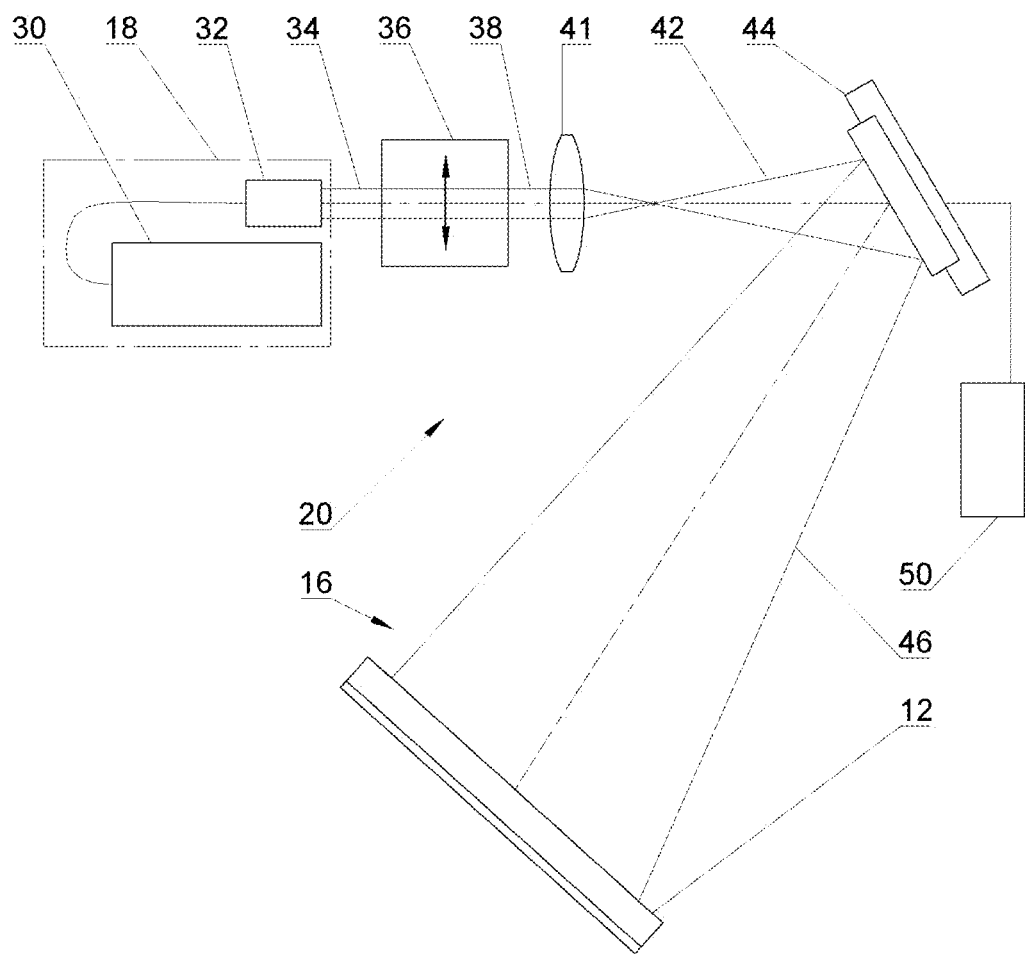
FIG. 5 illustrates another example of an imaging system for use in connection with the system for powder bed fusion shown in FIGS. 1A-1C; in this example, laser light is collimated, and a polarizer and divergent lens realize projection and direct laser light to a spatial light modulator.

FIG. 5 illustrates yet another embodiment of an optical arrangement which may be used in the apparatus discussed above in connection with FIGS. 1A-1C. In this example, the laser light is collimated and a polarizer 36 and divergent lens 41 realize projection of the laser light onto LCoS panel 44. In this embodiment, no additional projecting optics are used to convey the spatially light modulated laser beam 46 to the work area 16 of powder bed 12 as the laser light is already diverging. Also, if desired the polarizer 36 may not provide a beam splitting function. Instead, infra-red heaters may be employed as there is no secondary beam to provide heating of the powdered material in the powder bed. Such heaters may also be used in addition to or in place of secondary laser beams in other embodiments of the invention.

FIG. 6 illustrates still another embodiment of an optical arrangement which may be used in the apparatus discussed above in connection with FIGS. 1A-1C. In this example, a mirror galvanometer (or "galvo") unit 54, e.g., composed of one or more tiltable mirror arrangements 56, 58, is used to direct secondary laser beam 60 towards work area 16 of powder bed 12. Additional optical elements, such as mirror 62 and projecting optics 64 may also be included in the optical path of the secondary beam. Secondary laser beam 60 may provide heating of the work area or, as illustrated, may be used to provide contouring of high definition edges of the cross-sectional layer under fabrication.

The LCoS display used to produce a spatially light modulated beam in the above-described embodiments is an example of a two-dimensional, phase spatial light modulator (phase SLM). It includes a number of individually addressable pixels, which, depending on their state (e.g., up to 256 levels of darkness) can reshape the beam across its entire plane so that it is fully utilized in the shape of the desired cross-section. That is, the LCoS display 44 modulates the incident light beam with a liquid crystal layer so that the phase of the light is affected, preferably without any change to the light intensity and polarization. The phase modulation is achieved with high linearity by controlling the liquid crystal state for each pixel (e.g., by applying or not applying a voltage between electrodes) using, for example, a control signal from controller 50. One example of a phase LCoS SLM suitable for use in systems configured in accordance with embodiments of the present invention is the Exulus® HD1 Spatial Light Modulator available from Thorlabs of Newton, N.J. In other embodiments, an amplitude SLM may be used. Amplitude SLMs change the intensity of incident light, rather than its phase, according to pixel state.

Figure 7:
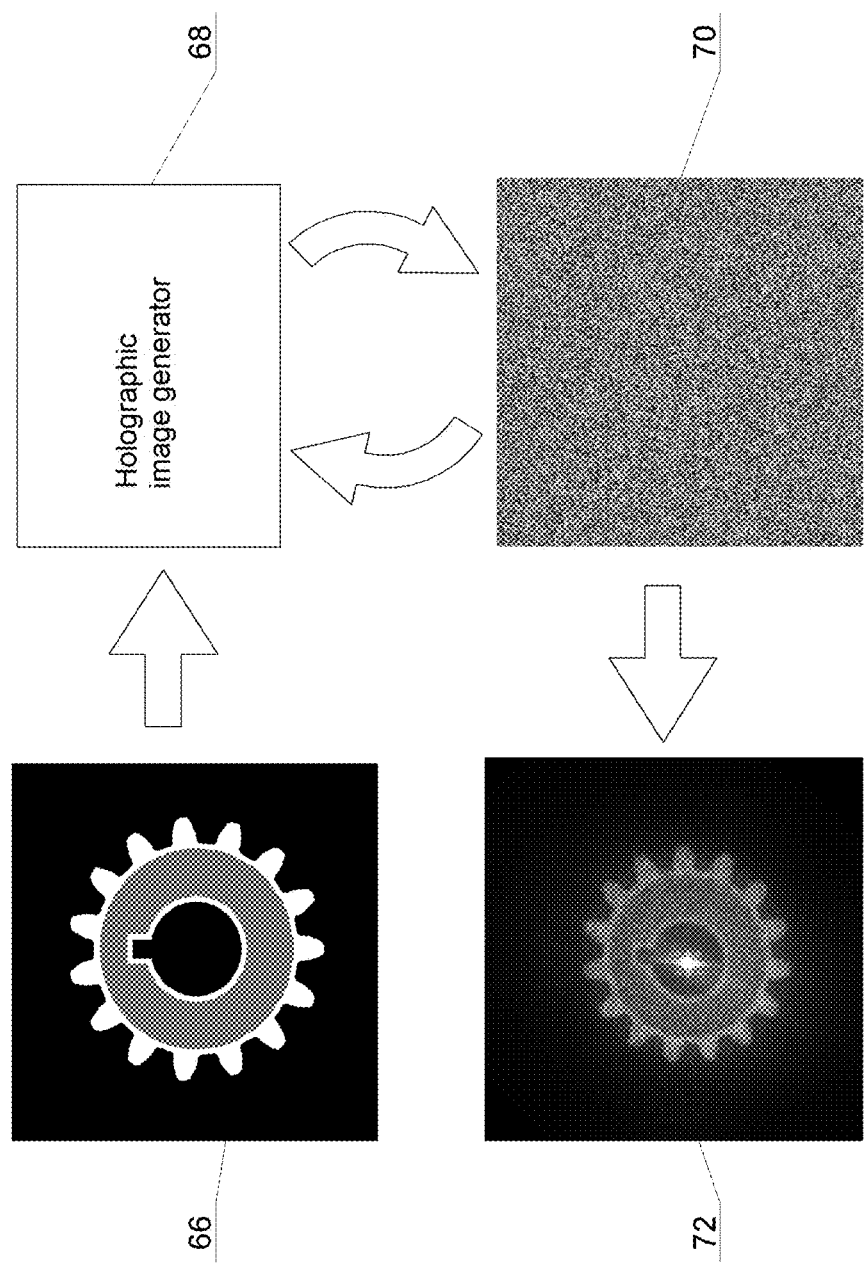
FIG. 7 illustrates an example of computer-generated holographic image and resulting far field image produced by imaging systems for use in connection with the system for powder bed fusion shown in FIGS. 1A-1C.

In each instance, phase SLM and amplitude SLM, a computer-generated hologram is used to create a pattern on the SLM panel. The pattern is a collection of pixels in different states that is resolved to an optical image in the far field by reflection of the incident light beam. FIG. 7 shows an example of an original image 66 that is converted to a computer-generated hologram through the use of an appropriately programmed computer system (i.e., holographic image generator) 68. The holographic image 70 displayed on the LCoS display reflects an incident laser beam as discussed above, and the resulting spatially light modulated beam is projected onto the work area of the powder bed so as to produce a representation 72 of the original image in a focal plane at the work area. The image includes bright spots (areas where laser light is incident on the powdered media present in the powder bed) and dark spots (areas where no laser light is incident). The powdered medium is fused by the laser light where it is present and remains unfused where the laser light is not present. In this way, a cross section of the object under fabrication is created, an entire cross section at a time. This latter point is important. Unlike conventional SLS apparatus, in which the laser is scanned over the work area to trace out the shape of the cross section being fabricated, in the present invention an image of an entire cross section of the object under fabrication is projected onto the powdered medium in the powder bed, and the entire cross sectional layer is fabricated at one time through fusion of the powdered medium in places corresponding to areas where laser light (i.e., the spatially light modulated laser beam reflected from the LCoS display) is incident.

As shown in FIG. 7, the projected image 72 has a distinct bright spot in its center. This is an example of a 0th order diffraction effect and is generally an undesirable artifact in the projected image. Such image defects can be eliminated by adjusting the computer-generated hologram pattern displayed on the LCoS display, for example by adding Fresnel lens focusing effect to that pattern. These focusing effects can be added through the use appropriate software control of the holographic image generator 68. An example of a computer software package for generating holographic images of the kind contemplated for use in accordance with the present invention is the Exulus SLM software for personal computer control of the Exulus SLM, available from Thorlabs.

In the above-described embodiments, reference is made to various controllers 28, 50. These controllers are examples of processor-based control devices that operate according to program instructions. In other words, they are specially programmed computer systems. As such, it should be recognized that the operations referred to herein are machine operations and various embodiments of the present invention may be implemented with the aid of processor-implemented processes or methods (a.k.a. programs or routines) that may be rendered in any processor-executable language. Such processor-implemented processes or methods may be stored (in its processor-executable language form) in a processor-readable storage medium, such as, but not limited to, any type of disk-based memory, solid state memory, or other media, which media may be readable only or read/writable. A controller suitable for use in connection with the present invention will, generally, include one or more busses or other communication mechanisms for communicating information, and one or more processors coupled with the bus(ses) for processing information. The controllers also will include a main memory, such as a random access memory (RAM) or other dynamic storage device, coupled to the bus(ses) for storing information and instructions to be executed by processor(s), and for storing temporary variables or other intermediate information during execution of instructions to be executed by processor(s). The controllers further will include one or more static storage devices, e.g., a read only memory (ROM), coupled to the bus(ses) for storing static information and instructions for the processor(s). A long term storage device, such as a hard disk or flash drive, may also be included and coupled to the bus(ses) for storing information and instructions. Optionally, human interface devices such as a display, keyboard (of other input device), and/or mouse (or other cursor control device) may also be included (via coupling to the bus(ses) for communicating information and command selections to the processor(s). Likewise, the controllers may include communication interfaces to provide two-way data communication with sensors, such as imaging devices, actuators, such as lasers, optical components, spatial light modulators, and/or remote computer systems. These communication interfaces may allow for conventional, wired and/or wireless, computer network communications and/or communications via proprietary communication protocols.

Using the apparatus described above, in one embodiment of the invention a three-dimensional article may be manufactured by laser fusion. For example, a first layer of a powdered medium may be distributed over a powder bed of the apparatus and heated. The heating may be effected by infra-red heaters, and/or a laser. Where a laser is employed for this purpose, the laser may be the same laser used for producing the cross section of the object under fabrication, in which case an emitted laser beam may be split and a portion thereof (appropriately modified to have a desired energy distribution over its beam width) directed on the powdered medium in a working area of the powder bed to heat the powdered medium to a temperature near, but not over, its melting point. In some cases, where a combination of heating means is used, one or more infra-red heaters may be used to heat the powdered medium to a first temperature, below the melting point of the powdered medium, and the laser used to provide additional energy to heat the powdered medium to a second, higher temperature that is still below its melting point. This may allow for more precise control over the ambient heating of the powdered medium in the powder bed and the temperature of said medium may be monitored using infra-red imaging devices so as to allow for control of the heat energy being applied thereto.

An image of a cross-sectional layer of the object being fabricated is projected on at least a portion of the top layer of the powdered medium distributed over the powder bed. In accordance with the present invention, this image of the cross-sectional layer is created by spatial light modulation of a laser beam, e.g., in the fashion discussed above, and projection of a resulting spatial light modulated laser beam through an optical path onto the top layer of the powdered medium in the powder bed. The spatial light modulated laser beam has sufficient energy to fuse that portion of the powdered medium in locations in the powder bed corresponding to the image of the cross-sectional layer of the object. In this way, an integral layer of the powdered medium having a shape corresponding to the image of the cross-sectional layer of the object is formed.

The same imaging devices used to monitor the heating of the powdered medium in the powder bed can be used to monitor the fusing thereof and, based on the imaging, the power of the beam over its cross section can be controlled automatically, for example by varying the gray level of the image of the cross section to be fabricated. To better understand this operation, consider the example shown in FIG. 8. An image to be projected onto the powdered medium in the powder bed is shown at 74. This image represents a cross-section of an object to be fabricated and is in this instance in the shape of a plus sign ("+"). The image of the cross section of the object is converted to a computer-generated hologram 76 through the use of an appropriately programmed computer system, as described above. The holographic image 76 is displayed on the LCoS display to produce a spatially light modulated beam that is projected onto the work area of the powder bed. The result is a representation 78 of the original image in a focal plane at the work area of the powder bed.

As shown in this example, the projection of the original image is uneven, with some areas of the image being brighter than others. If left unchecked, this may lead to some areas of the powdered medium being improperly fused, while others are overmelted. Accordingly, one or more infra-red images 80 of the projection of the original image are captured and analyzed 82 so that the gray levels of the original image of the cross section to be fabricated are adjusted 84. In the adjusted image 84, the gray levels of the lower portion of the plus sign are darkened in their interiors as compared to the gray level of the remaining portion of the plus sign. The adjusted image 84 is converted to a computer-generated hologram 86, and a resulting representation 88 of the adjusted image is projected onto the focal plane at the work area of the powder bed. As illustrated, the brightness of this representation 88 of the adjusted image is more even over its entirety than the previous representation 78 of the original image 74, and will therefore provide more even distribution of the laser energy over the powdered medium to be fused.

The analysis of the infra-red images may be performed visually, e.g., by an operator of the system, or may be performed robotically using one or more machine vision analysis techniques. Machine vision analyses may involve comparisons of light intensities (e.g., representative of power distribution or temperature distribution) over various portions of an image that represent places where the powdered medium is to be fused and places where no fusion is to occur. For example, thresholds may be established which represent maximum light intensities that should not be exceeded in areas where no fusion of the powdered medium is to occur. Any measured light intensities over that threshold would then be associated with areas of the image which require gray level adjustment so as to alter the intensity of the laser light at the work area of the powder bed. Similarly, color or gray level analysis of areas where fusion of the powdered medium is to occur could be analyzed so as to ensure the light intensity is sufficiently high so as to ensure fusion of the powdered medium, but no so high as to cause vaporization thereof.

Figure 8:
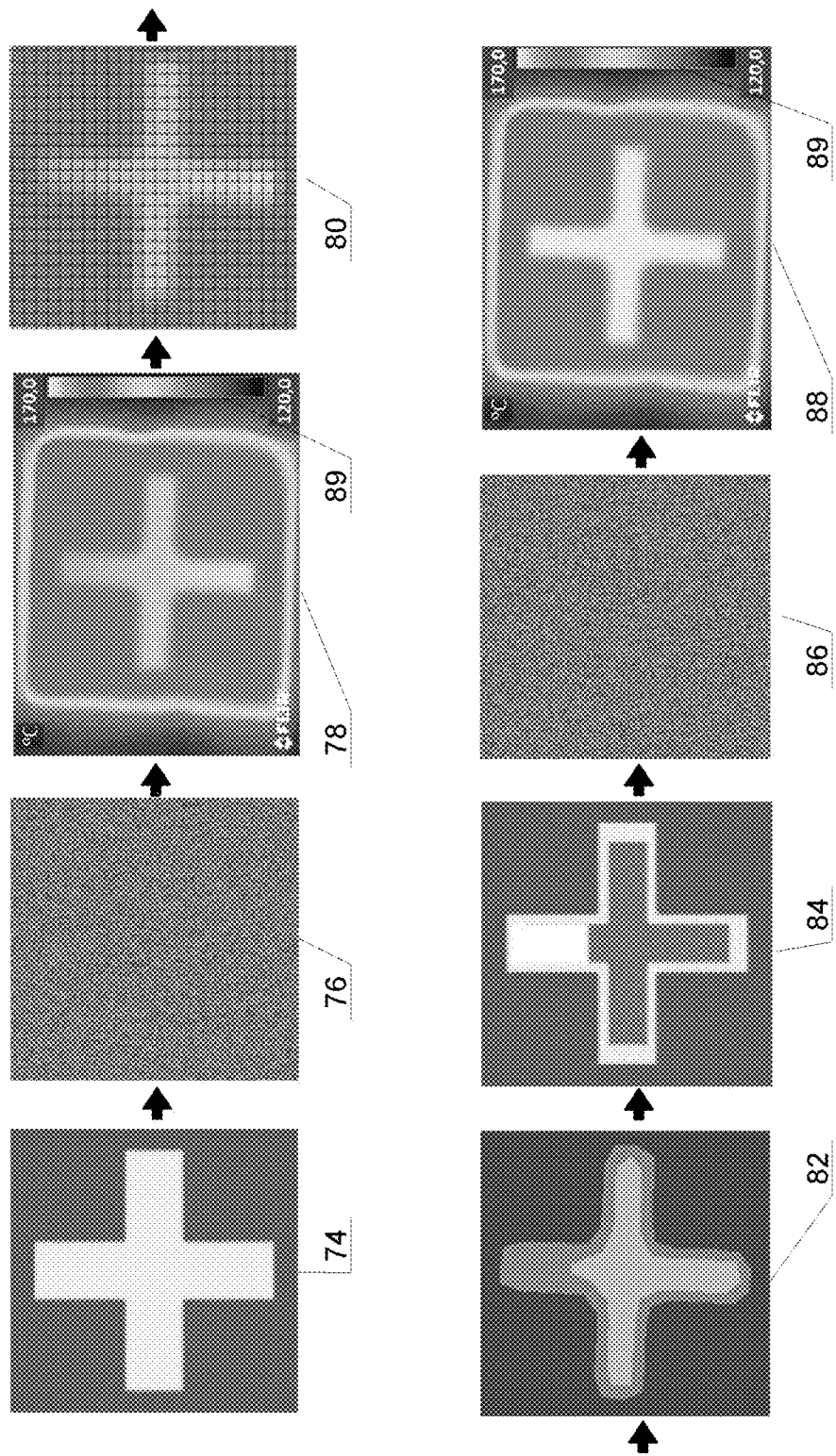
FIGS. 8 and 9 illustrate examples of adjusting a holographic image of a cross-section of an object to be fabricated with a system for powder bed fusion in response to feedback provided by an infra-red monitoring system configured in accordance with embodiments of the present invention.
Figure 9:
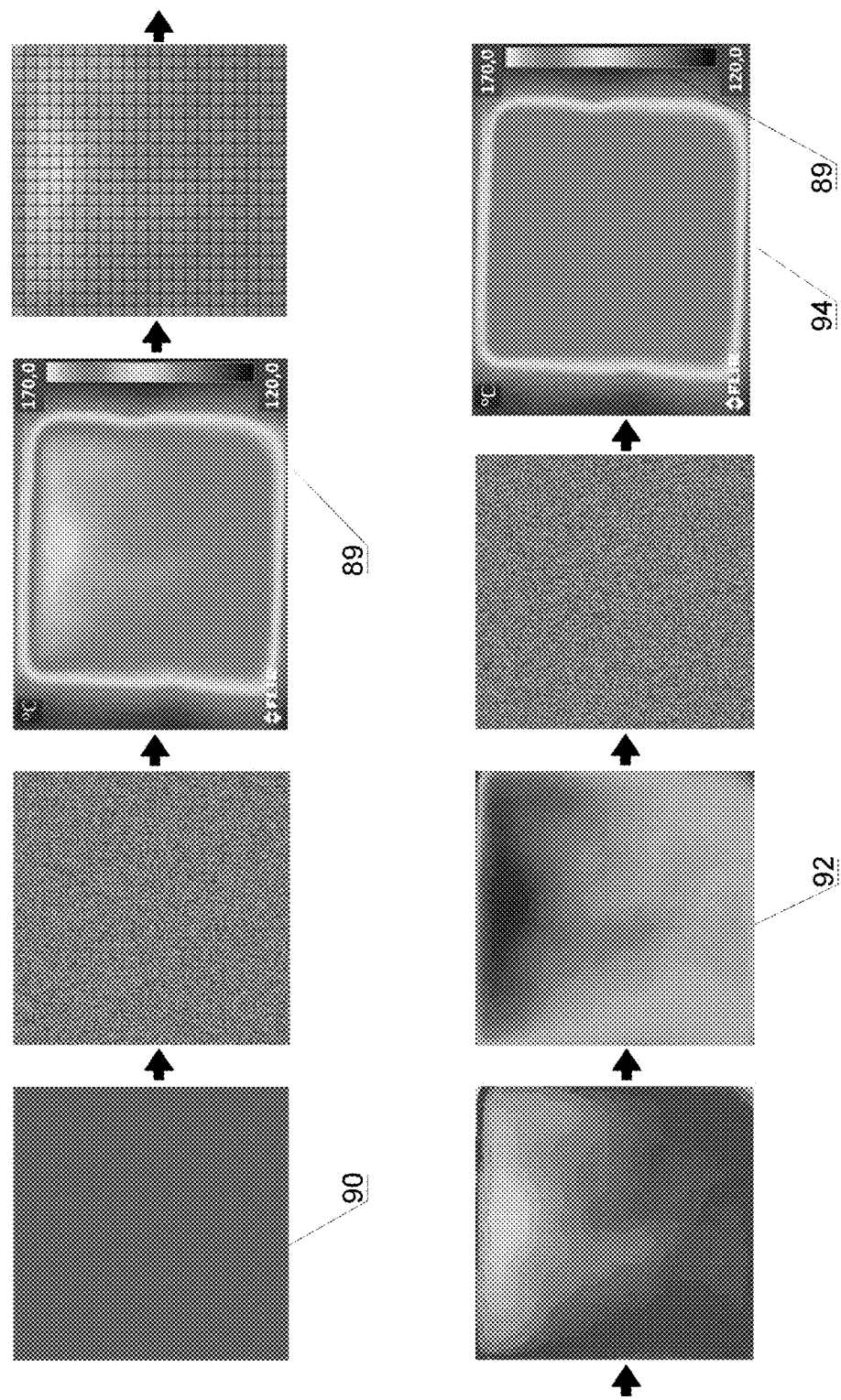

The example shown in FIG. 8 concerns an original image 74 having only dark or light features (a binary image), but the same process may be applied to an original image 90 having various gray levels, as shown in FIG. 9. In this example, the adjustments made to the original image based on the infra-red image analysis result in changes to the gray levels across the entire image, as shown at 92. These adjustments provide for uniform light intensity across an entire cross section, as shown at 94.

Upon completion of the fusing of the cross-sectional area of the object, a new top layer of the powdered medium is distributed over the now completed cross section (and any unfused portion of the powdered medium), and the application of the spatially light modulated laser beam is repeated for an image corresponding to a new cross-sectional layer of the object being fabricated. This forms a new integral layer of the powdered medium having a shape corresponding to the image of this new cross-sectional layer of the object. This process is repeated for as long as desired, so as to ultimately form the three-dimensional article. As mentioned above, during this fabrication process the quality and accuracy of reproduction of the respective projections of the images of the cross-sectional layers of the object at the powder bed may be controlled by monitoring these projections with one or more imaging devices and controlling the power of the spatially modulated laser beam incident on the powdered medium over the beam's cross section. In addition, times of applying the respective projections of the original images on respective layers of the powdered medium may also be controlled in accordance with the monitored image analysis.

Spatial light modulation of the laser beam to form the projections of images on the powdered medium in the powder bed may be phase spatial light modulation of an incident laser beam or, in other embodiments, amplitude modulation of an incident laser beam. In either case, spatial light modulation of the incident laser beam may be effected by generating a holographic representation of an image of a cross-sectional layer of the object on an LCoS display, directing a non-spatial light modulated laser beam to be incident on the LCoS display, and using a reflected portion of the laser beam from the LCoS display as the spatial light modulated laser beam. Preferably, the holographic representation of the image on the LCoS display is corrected for 0th order diffraction effects and/or other optical aberrations in the spatial light modulated laser beam at its image plane.

In one embodiment of the invention, a work space of approximately 300 mm square (i.e., a target area of 90,000 mm$^2$) is provided. To print a layer in under 10 secs, an estimated optical power of approximately 700 W may be required. When the workspace is only 40 mm (1600 mm$^2$), an estimated optical power of only approximately 13 W is expected to be needed.

The foregoing embodiments are discussed in connection with a reflective LCoS panel, but other embodiments may employ a transmissive LCoS panel. In such instances, images are provided by transmission of a laser beam through a holographic representation of an image displayed in the panel and onto an image plane at the powder bed.

As described above, the image of the cross section to be fabricated may be modified (e.g., by gray level adjustments) prior to generation of the holographic representation of the image so that the resulting spatially light modulated laser beam has a non-uniform intensity across its cross section. This allows some pixels at the image plane (i.e., areas of the powdered medium at the powder bed) to be more or less intense than others. Thus, the projection of the image can be controlled so that, for example, edges of the cross section of the object being fabricated are imaged with light energy of a different intensity than other portions of the cross section in order to achieve better (more precise) edge quality. Similarly, areas of the cross section of the object being fabricated may be imaged with less intense light energy than other portions of the cross section in order to reduce the accumulation of heat in the interior or other areas of the article under fabrication. This may be accomplished, for example, by graying out areas of the holographic representation of the image of the cross-sectional layer of the three-dimensional article so that corresponding portions of the spatially light modulated laser beam incident on the powdered medium are less intense than other portions of the beam. The gray level adjustments to areas of the holographic representation of the image of the cross-sectional layer of the three-dimensional article may be created responsively to image analysis of a projection of the original image of the cross-sectional layer on the powdered medium in the powder bed, for example as provided by one or more of the above-mentioned imaging devices.

Thus, methods and apparatus as facilitate concurrent formation of cross-sectional layers of an object have been described. In various embodiments of the invention, a three-dimensional article may be formed by powder bed fusion of individual layers in which respective ones of layers of a powdered medium are distributed over a powder bed; at least portions of the respective layers of the powdered medium distributed over the powder bed are heated to a temperature below a melting point of the powdered medium; and images of respective cross-sectional layers of the three-dimensional article are projected on the respective layers of the powdered medium distributed over the powder bed. The projected images of the respective cross-sectional layers are created by spatial light modulation of a first laser beam and projection of a resulting spatial light modulated laser beam through an optical path onto the respective layers of the powdered medium. The spatial light modulated laser beam preferably has sufficient energy to fuse that portion of the powdered medium in locations in the powder bed corresponding to a then-projected image of a respective cross-sectional layer of the three-dimensional article so as to form an integral layer of the powdered medium having a shape corresponding to that image of the respective cross-sectional layer of the three-dimensional article. After forming such an integral layer, a next one of the respective layers of the powdered medium are distributed over a powder bed (e.g., using a roller process), and the procedure repeats for that next layer and an image of the associated next cross-sectional layer of the three-dimensional article. Through this iterative process, the three-dimensional article is fashioned.

In the above-described embodiments, for each image of a respective cross-sectional layer of the three-dimensional article, spatial light modulation of the first laser beam may include generating a representation of the image of the respective cross-sectional layer of the three-dimensional article on a liquid crystal on silicon panel or other modulation device (e.g., a DMD), directing a non-spatial light modulated portion of the first laser beam to be incident on the representation of the image of the respective cross-sectional layer, and using a reflected or transmitted portion of the first laser beam from the representation of the image of the respective cross-sectional layer on the liquid crystal on silicon panel as the spatial light modulated laser beam. Qualities of respective projected images of the cross-sectional layers of the three-dimensional article at the powder bed may be controlled by monitoring the respective projected images with one or more imaging devices (e.g., infra-red imaging devices, CCD cameras, etc.) and adjusting characteristics of the corresponding respective images of the cross-sectional layers of the three-dimensional article in accordance therewith. For example, gray levels of portions of the corresponding respective images may be adjusted to provide even or other desired illumination of the powdered medium in the powder bed by the spatial light modulated laser beam. The spatial light modulation effected by the spatial light modulation device may be phase spatial light modulation or amplitude spatial light modulation, and the holographic representation of the image of the cross-sectional layers may be corrected for 0th order diffraction effects in the spatial light modulated laser beam at an image plane.

In the above-described embodiments, the powdered medium distributed over the powder bed may be heated to a temperature below the melting point of the powdered medium by one or more of: a second laser beam directed towards the powder bed through a second optical path (which second optical path may include a spatial light modulation device such as a liquid crystal on silicon device or a digital micromirror device, or diffractive optics), and one or more infra-red heaters. Where a second laser beam is used for heating purposes, the first laser beam and the second laser beam may be created from a common laser beam using a polarizing beam splitter. Heating may be formed so that the infra-red heaters heat the powdered medium to a first temperature, and the laser heats the powdered medium to a second temperature.

In some embodiments of the invention, respective second images of each respective cross-sectional layer of the three-dimensional article may be projected to respective layers of the powdered medium (either their respective entireties or only the edges thereof) distributed over the powder bed, wherein the respective second projected images of the respective cross-sectional layers are created by spatial light modulation of a second laser beam and projection of a resulting second spatial light modulated laser beam through a second optical path (which may include a mirror galvanometer arrangement or other directing arrangement) onto said respective layers of the powdered medium. Such an embodiment facilitates contouring of the edges of the article under fabrication. In such instances, the first and second laser beams may be formed from a common laser beam, for example using a polarizing beam splitter. In some cases, a mirror galvanometer arrangement is included in the second optical path, and respective second images of each respective cross-sectional layer of the three-dimensional article are projected on the respective layers of the powdered medium distributed over the powder bed.

As with the above-described embodiments, for each image of a respective cross-sectional layer of the three-dimensional article, spatial light modulation of the first laser beam may be effected using a holographic representation of the image of the respective cross-sectional layer of the three-dimensional article on a liquid crystal on silicon panel to provide a phase or amplitude modulated spatial light modulated laser beam from a non-spatial light modulated portion of the first laser beam incident on the liquid crystal on silicon panel. The holographic representation of the image of the respective cross-sectional layer of the three-dimensional article may be created from a modified version of the image of the respective cross-sectional layer of the three-dimensional article, where the modified version of the image of the respective cross-sectional layer has gray levels thereof adjusted from those associated with an original image of the respective cross-sectional layer of the three-dimensional article according to image analysis of the original image of the respective cross-sectional layer, either before or after projection on the powdered medium in the powder bed. Similarly, spatial light modulation of the first laser beam may be effected using a liquid crystal on silicon panel, a DMD, or diffractive optics.

Example Embodiments

A. A method for forming a three-dimensional article by powder bed fusion, comprising the steps of: (a) distributing a first layer of a powdered medium over a powder bed; (b) heating the first layer of the powdered medium distributed over said powder bed to a temperature below a melting point of the powdered medium; (c) projecting an image of a first cross-sectional layer of the three-dimensional article on the first layer of the powdered medium distributed over said powder bed, wherein a projected image of the first cross-sectional layer is created by spatial light modulation of a first laser beam and projection of a resulting spatial light modulated laser beam through a first optical path onto the first layer of the powdered medium, said spatial light modulated laser beam having sufficient energy to fuse that portion of the powdered medium in locations in the powder bed corresponding to said image of the first cross-sectional layer of the three-dimensional article so as to form a fused portion of the first layer of said powdered medium having a shape corresponding to said image of the first cross-sectional layer of the three-dimensional article; (d) distributing a second layer of the powdered medium over the first layer of the powdered medium, and repeating steps (b) and (c) the second layer and an image of a second cross-sectional layer of the three-dimensional article, respectively, so as to form a fused portion of the second layer of said powdered medium having a shape corresponding to said image of the second cross-sectional layer of the three-dimensional article; and (e) further repeating step (d) for additional layers of the powdered medium, each individual one of said additional layers being distributed over an immediately preceding layer of the powdered medium, additional fused portions of respective ones of the additional layers, and additional images of respective additional cross-sectional layer of the three-dimensional article, so as to form the three-dimensional article.

B. The method of embodiment A, wherein, for each image of a respective cross-sectional layer of the three-dimensional article, spatial light modulation of the first laser beam comprises generating a representation of the image of the respective cross-sectional layer of the three-dimensional article on a spatial light modulator, directing a non-spatial light modulated portion of the first laser beam to be incident on the holographic representation of the image of the respective cross-sectional layer, and using a reflected portion of the first laser beam from the representation of the image of the respective cross-sectional layer on the spatial light modulator as the spatial light modulated laser beam, wherein the spatial light modulator comprises one of a liquid crystal on silicon panel, or a digital micromirror device.

C. The method of embodiment B, wherein qualities of respective projected images of the cross-sectional layers of the three-dimensional article at the powder bed are controlled by monitoring measured power or temperatures distributions on the respective projected images during the projecting of the image and fusing of the powdered medium with one or more imaging devices, and adjusting gray levels of corresponding respective images of the cross-sectional layers of the three-dimensional article or times of fusing of the powdered medium to ensure said power intensities are sufficiently high enough to fuse the powdered medium without overmelting it.

D. The method of embodiment B, wherein light intensities of portions of respective projected images of the cross-sectional layers of the three-dimensional article at the powder bed are controlled by monitoring respective projected images during the projecting of the image and fusing of the powdered medium with one or more imaging devices, and adjusting gray level portions of corresponding respective images of the cross-sectional layers of the three-dimensional article.

E. The method of embodiment B, wherein a time of fusing the powdered medium is controlled by monitoring feedback images of the powdered medium during the projecting of the image and fusing of the powdered medium produced by one or more imaging devices.

F. The method of embodiment B, wherein for one or more of the layers of the powdered medium, the respective image of the respective cross-sectional layer of the three-dimensional article is gray level-adjusted from an original version thereof according to image analysis of a projection of the respective image of the respective cross-sectional layer of the three-dimensional article on the powdered medium in the powder bed before the projection of the image and fusion of the powdered medium.

G. The method of embodiment B, further comprising projecting respective second images of each respective cross-sectional layer of the three-dimensional article on the respective layers of the powdered medium distributed over said powder bed, wherein respective second projected images of the respective cross-sectional layers are created by spatial light modulation of a second laser beam and projection of a resulting second spatial light modulated laser beam through a second optical path onto said respective layers of the powdered medium, wherein the spatial light modulation is provided by a liquid crystal on silicon panel, digital micromirror device, or diffractive optics.

H. The method of embodiment (ii. wherein spatial light modulation of the second laser beam and projection of the resulting second spatial light modulated laser beam through the second optical path includes directing the second laser beam with a galvo mirror.

I. The method of embodiment H, wherein spatial light modulation of the second laser beam comprises spatial light modulation using one of a liquid crystal on silicon panel, a digital micromirror device, or diffractive optics.

J. The method of embodiment A, wherein the heating of the respective layers of the powdered medium distributed over said powder bed is performed by heating the powdered medium distributed over said powder bed to a first temperature by an infra-red heating element, and heating the powdered medium distributed over said powder bed to a second temperature higher than the first temperature by directing a second laser beam towards the powder bed through a second optical path that includes a second spatial light modulator.

K. The method of embodiment B, wherein the respective representations of the images of the respective cross-sectional layers of the three-dimensional article are corrected for distortions in the spatial light modulated laser beam at an image plane.

L. The method of embodiment A, wherein, for each image of a respective cross-sectional layer of the three-dimensional article, spatial light modulation of the first laser beam comprises generating a holographic representation of the image of the respective cross-sectional layer of the three-dimensional article on a liquid crystal on silicon panel, directing a non-spatial light modulated portion of the first laser beam to be incident on the holographic representation of the image of the respective cross-sectional layer, and using a transmitted portion of the first laser beam from the holographic representation of the image of the respective cross-sectional layer on the liquid crystal on silicon panel as the spatial light modulated laser beam.

M. The method of embodiment I, wherein qualities of respective projected images of the cross-sectional layers of the three-dimensional article at the powder bed are controlled by monitoring said respective projected images with one or more imaging devices and adjusting characteristics of corresponding respective images of the cross-sectional layers of the three-dimensional article in accordance therewith.

N. The method of embodiment J, wherein the characteristics of the corresponding respective images of the cross-sectional layers of the three-dimensional article that are adjusted comprise gray levels of portions of the corresponding respective images.

O. A powder bed fusion apparatus, comprising: means for distributing respective layers of a powdered medium over a powder bed; means for heating a current one of said respective layers of the powdered medium distributed over said powder bed to a temperature below a melting point of the powdered medium; means for projecting respective images of respective cross-sectional layers of an object on the current one of the respective layers of the powdered medium distributed over said powder bed, a respective projected image of a respective cross-sectional layer being created by spatial light modulation of a first laser beam and projection of a resulting spatial light modulated laser beam through a first optical path onto said current one of the respective layers of the powdered medium so as to form a fused portion current one of the respective layers of the powdered medium in locations in the powder bed having a shape corresponding to said respective image of the respective cross-sectional layer of the object; a control system coupled to the means for distributing, means for heating, and means for projecting, said control system including a processor and a memory coupled to the processor, the memory storing instructions, which instructions when executed by the processor cause the processor to, for each respective cross-sectional layer of the object: cause the means for distributing to distribute, one at a time, said respective layers of the powdered medium over the powder bed, each successive respective layer of the powdered medium being distributed over a previously distributed one of the respective layers of the powdered medium, cause the means for heating to heat the current one of the respective layers of the powdered medium distributed over said powder bed to a temperature below a melting point of the powdered medium, and cause the means for projecting the respective projected image of the respective cross-sectional layer of the object being fabricated onto the current one of the respective layers of the powdered medium then-distributed over said powder bed by spatial light modulation of the first laser beam.

P. The powder bed fusion apparatus of embodiment O, wherein the means for projecting comprises one of a liquid crystal on silicon panel, or a digital micromirror device, and the memory stores further instructions, which further instructions when executed by the processor cause the processor to, for each respective cross-sectional layer of the object, generate a representation of a respective image of the respective cross-sectional layer of the object on the liquid crystal on silicon panel or digital micromirror device, as appropriate, direct a non-spatial light modulated portion of the first laser beam to be incident on the representation of the image of the respective cross-sectional layer, and use a reflected portion of the first laser beam from the representation of the image of the respective cross-sectional layer on the liquid crystal on silicon panel or digital micromirror device, as appropriate, as the spatial light modulated laser beam.

Q. The powder bed fusion apparatus of embodiment P, further comprising a feedback system including one or more imaging devices, said feedback system coupled to the control system, and wherein the memory stores second further instructions, which second further instructions when executed by the processor cause the processor to monitor the respective images of the cross-sectional layers of the object at the powder bed using images from the one or more imaging devices, determine qualities of the respective images of the cross-sectional layers of the object, and adjust characteristics of corresponding respective images of the cross-sectional layers of the three-dimensional article in accordance therewith.

R. The powder bed fusion apparatus of embodiment Q, wherein the characteristics of the corresponding respective images of the cross-sectional layers of the three-dimensional article that are adjusted comprise gray levels of portions of the corresponding respective images.

S. The powder bed fusion apparatus of embodiment O, wherein the means for heating comprises one or more infra-red heating devices and a second laser beam directed to the powder bed through a second optical path, and wherein the memory further stores instructions which when executed by the processor cause the processor to control the infra-red heating elements and the second laser beam to heat the respective layers of the powdered medium distributed over said powder bed to a temperature below a melting point of the powdered medium in stages, using the infra-red heating devices to heat the respective layers of the powdered medium to a first temperature and the second laser beam to heat the respective layers of the powdered medium to a second temperature, above the first temperature, where both the first temperature and the second temperature are below the melting point of the powdered medium.

T. The powder bed fusion apparatus of embodiment S, wherein the second optical path provides spatial light modulation of the second laser beam.

U. The powder bed fusion apparatus of embodiment T wherein the spatial light modulation of the second laser beam is effected by one of a second liquid crystal on silicon panel or second digital micromirror device.

V. The powder bed fusion apparatus of embodiment S, further comprising a polarizing beam splitter in an optical path between a laser source and the means for projecting, wherein the first laser beam and a second laser beam are created from a common laser beam incident on the polarizing beam splitter.

W. The powder bed fusion apparatus of embodiment O, wherein the means for projecting includes a liquid crystal on silicon panel and wherein the memory stores further instructions, which further instructions when executed by the processor cause the processor to, for each respective cross-sectional layer of the object, generate a holographic representation of a respective image of the respective cross-sectional layer of the object on the liquid crystal on silicon panel, direct a non-spatial light modulated portion of the first laser beam to be incident on the holographic representation of the image of the respective cross-sectional layer, and use a transmitted portion of the first laser beam from the holographic representation of the image of the respective cross-sectional layer on the liquid crystal on silicon panel as the spatial light modulated laser beam.

X. The powder bed fusion apparatus of embodiment W, wherein the memory stores second further instructions, which second further instructions when executed by the processor cause the processor to control gray levels of portions of respective projected images of the cross-sectional layers of the object at the powder bed by monitoring said respective projected images with one or more imaging devices and adjusting the gray levels of portions of corresponding respective images of the cross-sectional layers of the three-dimensional article in accordance therewith.

Y. The powder bed fusion apparatus of embodiment O, wherein the means for projecting further comprises a second optical path and the memory stores further instructions, which further instructions when executed by the processor, cause the processor to control the means for projecting to project respective second respective images of each respective cross-sectional layer of the object on respective layers of the powdered medium distributed over said powder bed, wherein the second respective projected images of the respective cross-sectional layers are created by directing a second laser beam through the second optical path, which comprises one or more of a liquid crystal on silicon panel, a digital micromirror device, diffractive optics, and a galvo mirror, and projection of a resulting laser beam onto said respective layers of the powdered medium.

Z. The powder bed fusion apparatus of embodiment Y, wherein the first and second laser beams are formed from a common laser beam using a polarizing beam splitter.

AA. The powder bed fusion apparatus of embodiment OO, wherein the representation of the image of the respective cross-sectional layer of the object is created from a modified version of the image of the respective cross-sectional layer of the object, said modified version of the image of the respective cross-sectional layer having gray levels thereof adjusted from those associated with an original image of the respective cross-sectional layer of the object according to image analysis of a projection of the original image of the respective cross-sectional layer on the powdered medium in the powder bed.

BB. An additive manufacturing apparatus, comprising: a powder storage system and powder bed for containing a powder medium a first optical path for projecting respective images of cross-sections of an object to be fabricated onto respective layers of the powder medium in the powder bed; and a control system coupled to and configured to operate the powder storage system to distribute, one at a time, said respective layers of the powder medium over the powder bed, each successive respective layer of the powder medium being distributed over a previously distributed one of the respective layers of the powder medium; coupled to and configured to operate components of the first optical path to project, one at a time, the respective images of cross-sections of the object being fabricated onto a current one of the respective layers of the powder medium then-distributed over said powder bed.

CC. The additive manufacturing apparatus of embodiment BB, wherein the first optical path comprises a laser source optically coupled to provide an incident collimated light beam to a polarizing beam splitter, such that a portion of the incident beam is provided at an output of the polarizing beam splitter as a polarized beam, said polarized beam being provided as an input to beam expander optically coupled to the polarizing beam splitter, said beam expander for expanding a beam width of the polarized beam to produce an expanded beam that is made incident upon a spatial light modulating apparatus optically coupled to the beam expander.

DD. The additive manufacturing apparatus of embodiment CC, wherein the laser source includes a laser optically coupled with a fiber collimator.

EE. The additive manufacturing apparatus of embodiment CC, wherein the spatial light modulating apparatus comprises one of a liquid crystal on silicon panel or digital micromirror device.

FF. The additive manufacturing apparatus of embodiment CC, wherein the first optical path further comprises projecting optics optically coupled to receive a spatially light modulated laser beam from the spatial light modulating apparatus and to project the spatially light modulated laser beam onto the powder bed.

GG. The additive manufacturing apparatus of embodiment FF, wherein the projecting optics comprise one of: projecting optics with a focusing lens realizing Fourier transformation and a focusing lens realizing projection; projecting optics with a focusing lens realizing Fourier transformation and an objective realizing projection; and projecting optics with a focusing lens realizing Fourier transformation and a negative lens realizing projection.

HH. The additive manufacturing apparatus of embodiment BB, wherein the first optical path comprises a laser source optically coupled to provide an incident collimated light beam to a collimator that is optically coupled with the laser source and which provides a collimated and expanded light beam to a polarizing beam splitter, such that a portion of the incident beam is provided at an output of the polarizing beam splitter as a polarized beam, said polarized beam being made incident upon a spatial light modulating apparatus optically coupled to the polarizing beam splitter.

II. The additive manufacturing apparatus of embodiment HH, wherein the spatial light modulating apparatus comprises one of a liquid crystal on silicon panel or digital micromirror device.

JJ. The additive manufacturing apparatus of embodiment HH, wherein the first optical path further comprises projecting optics optically coupled to receive a spatially light modulated laser beam from the spatial light modulating apparatus and to project the spatially light modulated laser beam onto the powder bed.

KK. The additive manufacturing apparatus of embodiment JJ, wherein the projecting optics comprise one of: projecting optics with a focusing lens realizing Fourier transformation and a focusing lens realizing projection; projecting optics with a focusing lens realizing Fourier transformation and an objective realizing projection; and projecting optics with a focusing lens realizing Fourier transformation and a negative lens realizing projection.

LL. The additive manufacturing apparatus of embodiment BB, wherein the first optical path comprises a laser source optically coupled to provide an incident collimated light beam to a polarizer, such that a portion of the incident beam is provided at an output of the polarizer as a polarized beam, said polarized beam being received as an input by a divergent lens optically coupled to the polarizer and producing an output diverging beam made incident upon a spatial light modulating apparatus optically coupled to the divergent lens.

MM. The additive manufacturing apparatus of embodiment LL, wherein the spatial light modulating apparatus comprises one of a liquid crystal on silicon panel or digital micromirror device.

NN. The additive manufacturing apparatus of embodiment BB further comprising a second optical path, said second optical path including a galvo unit 54 optically coupled to receive a component of the output of the polarizing beam splitter and direct said component as a second laser beam onto the powder bed.

Thus, methods and apparatus for additive manufacturing, and in particular to such methods and apparatus as facilitate formation of entire cross-sectional layers of an object at a time, have been described.

What is claimed is:

1. A powder bed fusion apparatus, comprising:
    means for distributing respective layers of a powdered medium over a powder bed;
    means for heating a current one of said respective layers of the powdered medium distributed over said powder bed to a temperature below a melting point of the powdered medium;
    means for projecting respective images of respective cross-sectional layers of an object on the current one of the respective layers of the powdered medium distributed over said powder bed, a respective projected image of a respective cross-sectional layer being created by a first liquid crystal on silicon (LCoS) panel, of the means for projecting, spatially modulating a first laser beam and projection of a resulting spatially light modulated laser beam through a first optical path onto said current one of the respective layers of the powdered medium so as to form a fused portion of the current one of the respective layers of the powdered medium in locations in the powder bed having a shape corresponding to said respective image of the respective cross-sectional layer of the object;
    a control system coupled to the means for distributing, means for heating, and means for projecting, said control system including a processor and a memory coupled to the processor, the memory storing instructions, which instructions when executed by the processor cause the processor to, for each respective cross-sectional layer of the object:
        cause the means for distributing to distribute, one at a time, said respective layers of the powdered medium over the powder bed, each successive respective layer of the powdered medium being distributed over a previously distributed one of the respective layers of the powdered medium,
        cause the means for heating to heat the current one of the respective layers of the powdered medium distributed over said powder bed to the temperature below the melting point of the powdered medium, and
        cause the means for projecting to project the respective image of the respective cross-sectional layer of the object being fabricated onto the current one of the respective layers of the powdered medium then-distributed over said powder bed by spatial light modulation of the first laser beam and to project second respective images of each respective cross-sectional layer of the object on respective layers of the powdered medium distributed over said powder bed, wherein the second respective projected images of the respective cross-sectional layers are created by directing a second laser beam through a second optical path, which comprises one or more of a second LCoS panel, a digital micromirror device, diffractive optics, and a mirror galvanometer, and projection of a resulting laser beam onto said respective layers of the powdered medium, wherein the first and second laser beams are formed from a common laser beam using a polarizing beam splitter and wherein the first LCoS panel is configured to receive the first laser beam from the polarizing beam splitter.

2. The powder bed fusion apparatus of claim 1, wherein the memory stores further instructions, which further instructions when executed by the processor cause the processor to, for each respective cross-sectional layer of the object, (1) generate a representation of a respective image of the respective cross-sectional layer of the object on the first LCoS panel, (2) direct the first laser beam to be incident on the representation of the respective image of the respective cross-sectional layer, and (3) use a portion of the first laser beam reflected from the representation of the respective image of the respective cross-sectional layer on the first LCoS panel as the spatially light modulated laser beam.

3. The powder bed fusion apparatus of claim 2, further comprising a feedback system including one or more imaging devices, said feedback system coupled to the control system, and wherein the memory stores second further instructions, which second further instructions when executed by the processor cause the processor to monitor qualities of the respective images of the cross-sectional layers of the object at the powder bed using images from the one or more imaging devices, determine power or temperature distributions on the respective cross-sectional layers of the object, and adjust gray levels of corresponding respective images projected on or time of fusion of the cross-sectional layers of the three-dimensional article in accordance therewith.

4. The powder bed fusion apparatus of claim 1, wherein the means for heating comprises one or more infra-red heating devices and a third laser beam directed to the powder bed through a third optical path, and wherein the memory further stores instructions which when executed by the processor cause the processor to control the infra-red heating elements and the third laser beam to heat the respective layers of the powdered medium distributed over said powder bed to the temperature below the melting point of the powdered medium in stages, using the infra-red heating devices to heat the respective layers of the powdered medium to a first temperature and the third laser beam to heat the respective layers of the powdered medium to a second temperature, above the first temperature, wherein both the first temperature and the second temperature are below the melting point of the powdered medium.

5. The powder bed fusion apparatus of claim 1, wherein the representation of the image of the respective cross-sectional layer of the object is created from a modified version of the image of the respective cross-sectional layer of the object, said modified version of the image of the respective cross-sectional layer having gray levels thereof adjusted from those associated with an original image of the respective cross-sectional layer of the object before the projection of the modified version of the image and fusion of the powdered medium.

6. The powder bed fusion apparatus of claim 1, wherein the means for projecting further comprises one of:
   (a) a first optical arrangement for creating and directing the first laser beam incident upon the first LCoS panel, said first LCoS panel arranged to direct the resulting spatially light modulated laser beam to projecting optics of the first optical path arranged to project the resulting spatially light modulated laser beam onto the powder bed, wherein the first optical arrangement for creating the first laser beam comprises a laser source optically coupled with a fiber collimator to provide an incident collimated light beam to the polarizing beam splitter, such that a portion of the incident collimated light beam is provided at an output of the polarizing beam splitter as a polarized beam, said polarized beam being provided as an input to a beam expander optically coupled to the polarizing beam splitter, said beam expander for expanding a beam width of the polarized beam to produce the first laser beam that is incident upon the first LCoS panel, which is optically coupled to the beam expander;
   (b) a divergent laser source to provide a light beam to a collimator optically coupled with the divergent laser source and which is arranged to provide a collimated and expanded light beam to the polarizing beam splitter, such that a portion of the collimated and expanded light beam is provided at an output of the polarizing beam splitter as a collimated, expanded, and linearly polarized beam, said collimated, expanded, and linearly polarized beam being made incident upon the first LCoS panel, which is optically coupled to the polarizing beam splitter; or
   (c) a second optical arrangement for creating and directing the first laser beam incident upon the first LCoS panel, said first LCoS panel arranged to direct a resulting spatially light modulated laser beam to the powder bed, wherein the second optical arrangement comprises a laser source optically coupled to a fiber collimator to provide an incident collimated light beam to a polarizer, such that a portion of the incident collimated light beam is provided at an output of the polarizer as a polarized beam, said polarized beam being received as an input by a divergent lens optically coupled to the polarizer and producing an output diverging beam made incident upon the first LCoS panel, which is optically coupled to the divergent lens.

7. The powder bed fusion apparatus of claim 6, wherein the means for projecting comprises the first optical arrangement and the projecting optics are optically coupled to receive the resulting spatially light modulated laser beam from the first LCoS panel and to project the resulting spatially light modulated laser beam onto the powder bed and the projecting optics comprise one of: projecting optics with a focusing lens realizing Fourier transformation and a focusing lens realizing projection; projecting optics with a focusing lens realizing Fourier transformation and an objective realizing projection; and projecting optics with a focusing lens realizing Fourier transformation and a negative lens realizing projection.

8. The powder bed fusion apparatus of claim 1, wherein the first LCoS panel is configured to reflect light from the polarizing beam splitter into the first optical path.

* * * * *